United States Patent
Mantel

(10) Patent No.: US 6,620,395 B1
(45) Date of Patent: Sep. 16, 2003

(54) TREATMENT OF PHOSPHO GYPSUM

(76) Inventor: Dirk Guustaaf Mantel, 3 Stellenberg Place, Strathavon 2031, Sandton (ZA)

( * ) Notice: Subject to any disclaimer, the term of this patent is extended or adjusted under 35 U.S.C. 154(b) by 0 days.

(21) Appl. No.: 09/830,405

(22) PCT Filed: Apr. 8, 1999

(86) PCT No.: PCT/IB99/00605

§ 371 (c)(1),
(2), (4) Date: Apr. 27, 2001

(87) PCT Pub. No.: WO00/24670

PCT Pub. Date: May 4, 2000

(30) Foreign Application Priority Data

Oct. 28, 1998 (ZA) .............................................. 98/9823

(51) Int. Cl.$^7$ .............................................. C01B 25/18
(52) U.S. Cl. .............. 423/321; 204/157.45; 204/157.52
(58) Field of Search ...................... 204/157.45, 157.52; 423/321.1

(56) References Cited

U.S. PATENT DOCUMENTS

| 3,847,766 A | | 11/1974 | Klaus | |
| 4,312,842 A | * | 1/1982 | Wilson et al. | 423/178 |
| 5,158,594 A | * | 10/1992 | Oxford | 71/25 |

FOREIGN PATENT DOCUMENTS

| DE | 25 03 482 | 8/1976 |
| FR | 2 151 808 | 4/1973 |

OTHER PUBLICATIONS

Stephanis C.G. et al., "Process (Mechanism) of Erosion of Soluble Brittle Materials Caused by Cavitation", Ultrasoncs Sonochemistry vol. 4, No. 3 (Jul. 3, 1997; pp 269–271.

Zhao Zhiiping et al., "Mechanism of Ultrasonic Mass Transfer in Phosphate Rock–Acid Reaction", Chemical Abstracts, vol. 128, No. 8 (Feb. 23, 1998).

Preobrazheskii N.A. et al., "Effect of Ultrasound on the Sulfuric Acid Leaching of Phosphorites", Chemical Abstracts, vol. 80, No. 6 (Feb. 11, 1974).

* cited by examiner

Primary Examiner—Stanley S. Silverman
Assistant Examiner—Maribel Medina
(74) Attorney, Agent, or Firm—Burns, Doane, Swecker & Mathis, L.L.P.

(57) ABSTRACT

A process is provided for recovering phosphoric acid from phospho gypsum produced as a by-product in a phosphoric acid production process and having water soluble $P_2O_5$ bound in the crystal lattice thereof. The process includes a) forming a suspension of phospho gypsum in an aqueous medium; b) subjecting the suspension to ultrasonic waves under conditions suitable to shatter the phospho gypsum crystal lattice releasing the bound water soluble $P_2O_5$ into the aqueous medium to produce phosphoric acid and a depleted phospho gypsum; c) separating the phosphoric acid from the depleted phospho gypsum and recovering the separated phosphoric acid; and d) optionally further treating the depleted phospho gypsum in a step to further reduce the level of any remaining water soluble $P_2O_5$ present in the depleted phospho gypsum. The level of the water soluble $P_2O_5$ in the depleted phospho gypsum is reduced to about 0.01% by weight.

5 Claims, No Drawings

TREATMENT OF PHOSPHO GYPSUM

BACKGROUND OF THE INVENTION

This invention relates to a process for treating phospho gypsum.

The manufacture of phosphoric acid, according to the wet process, consists in essence of reacting calcium phosphate rock with sulfuric acid. The calcium oxide in the rock reacts with the sulfuric acid to produce calcium sulphate di-hydrate, also known as gypsum. This calcium sulphate crystallises out in the phosphoric acid medium in the reactor. Since this gypsum is a by-product of the phosphoric acid production process it is commonly known as phospho gypsum.

The phospho gypsum is filtered and rinsed with water to recover as much phosphoric acid as is economically justified. However, the phospho gypsum typically contains water soluble $P_2O_5$ bound in the crystal lattice which is not recovered as phosphoric acid during the rinsing stage. As a result, phosphoric acid production plants lose substantial amounts of phosphoric acid, expressed as $P_2O_5$ bound in the gypsum crystal lattice.

In the manufacture of Portland cement, gypsum is interground with clinker in order to regulate the setting and hardening process of the cement after addition of water. When phospho gypsum is used for this purpose it is found that the setting times are extended to such a degree as to interfere with normal operations on a construction site. It has been found that these extended setting times are caused by the water soluble $P_2O_5$ in the gypsum.

Whilst it is possible to convert the water soluble $P_2O_5$ adhering to the outside of the gypsum particles to insoluble phosphates, by washing with a calcium hydroxide solution at ambient or elevated temperatures, the $P_2O_5$ in the crystal lattice is not accessible to the hydroxide under these conditions. Hence phospho gypsum treated in this manner gives rise to variable setting times when used in cement production.

Several processes exist to free the $P_2O_5$ in the crystals. Some consist in essence of drying the gypsum and heating same to high temperatures in order to break up the crystal structure thus releasing the $P_2O_5$. Limestone, having been added, dissociates at these high temperatures forming calcium oxide which then reacts with the $P_2O_5$ to form water insoluble calcium phosphates. The product, which consists of calcium sulphate anhydrite and calcium phosphate, is then cooled and sprayed with water to convert the anhydrite back to calcium sulphate hydrates. It should be noted that all $P_2O_5$ in the crystals is converted to insoluble phosphates and is thus lost to the phosphoric acid production process. It is clear that this process, and some variations of same, is energy intensive because of the drying and subsequent dehydration of the gypsum and the heat required to dissociate the limestone. Capital outlay is also high. Hence this process is economically not attractive.

SUMMARY OF THE INVENTION

According to one aspect of the invention there is provided a process for recovering phosphoric acid from phospho gypsum produced as a by-product in a conventional phosphoric acid production plant and having water soluble $P_2O_5$ bound in the crystal lattice thereof, the process comprising:
  a) forming a suspension of phospho gypsum in an aqueous medium;
  b) subjecting the suspension to ultrasonic waves under conditions suitable to shatter the phospho gypsum crystal lattice releasing the bound water soluble $P_2O_5$ into the aqueous medium; and
  c) recovering the phosphoric acid so released.

The depleted phospho gypsum is preferably treated in a further step to reduce any remaining water soluble $P_2O_5$ to a level which allows the gypsum to be added to a cementitious material for use as a setting regulator.

The level of water soluble $P_2O_5$ in the gypsum is preferably reduced to below 0.06% by weight, in particular to about 0.01% by weight.

The suspension is preferably subjected to ultrasonic waves of less than 2 MHz, typically 50 to 500 Hz or 16 kHz to 2 MHz.

During the subsequent treatment of the phospho gypsum, typically sonication of the depleted phospho gypsum in an aqueous medium, a neutralising agent may be added to the aqueous medium to convert the water soluble $P_2O_5$ into an insoluble phosphate.

According to a further aspect of the invention, there is provided a cement comprising phospho gypsum treated in accordance with the invention.

DESCRIPTION OF PREFERRED EMBODIMENTS

The crux of the invention is a process for dislodging $P_2O_5$ bound in the crystal structure or lattice of phospho gypsum, recovering the dislodged $P_2O_5$, and the further treatment of the depleted gypsum to render it suitable for use in either the cement industry or the gypsum products industry or both.

It has been reported in the literature that ultrasonic waves of suitable wavelength and intensity cause cavitation in a liquid medium. The small bubbles collapse giving rise to localised "hotspots" having very high temperatures and pressures, in addition to shockwaves. It has now been found that this phenomenon can be used for the shattering of a phospho gypsum crystal lattice thus releasing $P_2O_5$ bound therein.

In general the process consists of forming a suspension or slurry of phospho gypsum derived as a by-product in a conventional phosphoric acid production plant in an aqueaus medium, typically water, and subjecting the suspension to ultrasonic waves of a suitable wavelength. This process leads to the disruption or shattering of the phospho gypsum crystal lattice thus releasing the water soluble $P_2O_5$ bound in the crystal lattice to form phosphoric acid. Typically a wavelength of less than 2 MHz will be used to break up the crystal lattice. Examples of suitable wavelength ranges are 50–500 Hz and 16 kHz–2 MHz, based on economic and end use requirements.

Subsequent filtration and drying at low temperatures produces a gypsum product eminently suitable for the cement industry and for the general gypsum products industry whilst providing for the economic recovery of phosphoric acid.

Whilst laboratory tests have shown that a wide range of frequencies can be used, a sonicator suitable for industrial purposes has been found to be the patented Nearfield Acoustic Processor (NAP) manufactured by the Lewis Corporation of the USA. This machine has two opposing diaphragm plates vibrating at two different frequencies, namely 16 kHz and 20 kHz. These plates form the two active walls of the reaction chamber through which the slurry is pumped. The intensity of the vibrations can be adjusted as required, whilst the gap between the plates can be varied between 0.12 and 25.4 mm.

EXAMPLE

Phospho gypsum slurry was passed through a 10 mm gap between the vibrating reactor surfaces in a 2 kW NAP. The power was set at maximum.

Table 1 below shows the percent reduction in $P_2O_5$ content of the crystals achieved after the stated retention times in the reactor.

TABLE 1

| Time in Seconds | % Reduction based on initial $P_2O_5$ content |
| --- | --- |
| 2 | 52.5 |
| 30 | 60 |
| 120 | 75 |

This clearly shows that recovery in a one-pass system follows the law of diminishing returns, possibly due to the attenuating effect of the very small shattered crystals.

In order to improve phosphoric acid recovery, after the first sonication stage, the suspension can be passed through a high efficiency cyclone in order to separate the crystals. The oversized crystals can then be returned for a second pass through the sonicator.

Examination of the treated gypsum under a microscope revealed a significant increase in the number of very small gypsum crystals and the presence of hemi-hydrate in addition to di-hydrate. As the crystals become smaller so the gypsum will be more difficult to filter and dry, increasing operating costs. Recovery to be aimed at thus depends to a large extent on economic considerations.

Depending on the amount water soluble $P_2O_5$ remaining in the treated gypsum the latter can be used in the cement industry and/or the gypsum products industry. If necessary, the amount of $P_2O_5$ remaining in the phospho gypsum can be reduced even further. In the case of the cement industry, for example, levels of water soluble $P_2O_5$ of greater than 0.06% are not acceptable because of increased setting times.

This further treatment consists of the addition of a neutralising agent and further sonication. In this further treatment much of the remaining water soluble $P_2O_5$ in the gypsum is converted to an insoluble phosphate which does not interfere with the reactions taking place during the setting of the cement. The water soluble $P_2O_5$ content is typically reduced to less than 0.06% by weight, preferably to about 0.01% by weight.

The phospho gypsum may either be treated directly in the NAP to produce water insoluble calcium phosphate, or after the economically recoverable $P_2O_5$ has been removed previously.

Suitable neutralising agents have been found to be: Lime (calcium oxide or calcium hydroxide), Limestone (calcium carbonate), Portland cement, ground Portland cement clinker or any other material such as magnesium carbonate or dolomite which, on reaction with phosphoric acid, will produce water insoluble phosphates.

Table 2 below shows details of some of the experiments conducted using the treated gypsum of the invention and the resulting cement setting times. The latter were determined by an ISO accredited cement laboratory using standard ENV methods. The quantity of neutralising agent used in the experiments was based on the conversion of all $P_2O_5$ present in the gypsum to water insoluble phosphates.

TABLE 2

| Neutralising agent | Power Input KW | Depth of Reactor mm | Retention Time Sec | Slurry Solids % | Cement Setting Times | |
| --- | --- | --- | --- | --- | --- | --- |
| | | | | | Initial Min. | Final Min. |
| Lime | 2 | 10 | 2 | 30 | 200 | 230 |
| Limestone | 0.7 | 2 | 0.5 | 30 | 290 | 350 |
| | 2 | 10 | 1 | 23 | 215 | 255 |
| | 2 | 10 | 0.5 | 26 | 215 | 250 |
| | 2 | 10 | 2.4 | 30 | 185 | 280 |
| (1) | — | — | — | — | 347 | 420 |
| (2) | 2 | 10 | 1 | 27 | 193 | 290 |
| OPC | 2 | 10 | 1.5 | 30 | 180 | 215 |

To demonstrate the effect of sonication on cement setting times, an experiment was conducted in which a control slurry of phospho gypsum and limestone was vigorously agitated for 15 minutes, filtered, rinsed with fresh water and dried. This was interground with cement clinker and the setting times determined. (1) in the table refers. (2) refers to the same slurry, which was sonicated immediately after the addition of the limestone. The setting times were established by drying the filtercake within hours after production.

The above results show that the setting time of a cement using phospho gypsum treated in accordance with the invention is significantly reduced. In addition, it can be seen that cement setting times can be adjusted as required by choice of neutralising agents, reactor depth, power settings, slurry velocities and slurry solids contents. Hence for each application optimum conditions can be established.

In the pilot plant tests, based on local phosphoric acid plant operations, the preferred operating conditions of the pilot plant were found to be:

1. Power input—full;
2. Slurry solids content—26%;
3. Limestone addition—4% based on dry phospho gypsum containing not more than 1.3% total $P_2O_5$;
4. Reactor depth—10 mm (which for the 2 kW pilot plant NAP was found to be the most suitable); and
5. Retention time of slurry in reactor—1.2 seconds.

Sufficient treated gypsum was prepared for the full scale production of cement in two cement plants.

Setting times reported here were all determined in the same laboratory as mentioned above.

Plant A

| Produced 350 ton cement. | Initial Set | 200 minutes. |
| --- | --- | --- |
| | Final Set | 260 minutes. |
| Typical setting times using natural gypsum were: | | |
| | Initial Set | 200 minutes. |
| | Final Set | 283 minutes. |

Plant B

| Produced 135 ton cement. | Initial Set | 242 minutes. |
| --- | --- | --- |
| | Final Set | 294 minutes. |

XRD traces of the treated gypsum used showed the presence of limestone, calcium oxide, calcium sulphate di-hydrate and calcium sulphate half hydrate. This shows that many of the original gypsum crystals had been shattered and the limestone decomposed.

Thus, depending on local conditions and economic considerations sonication of phospho gypsum can be applied to provide additional recovery of $P_2O_5$ in a phosphoric acid plant in addition to rendering of the phospho gypsum suitable for use in the gypsum product industry, and as a cement set controller in the cement industry. The process of the invention is also believed to be environmentally friendly in that it does not require high energy inputs. Further, the need to produce costly waste dumps for untreated phospho gypsum is reduced.

What is claimed is:

1. A process for recovering phosphoric acid from phospho gypsum produced as a by-product in a phosphoric acid production process and having water soluble $P_2O_5$ bound in the crystal lattice thereof, the process comprising:
   a) forming a suspension of phospho gypsum in an aqueous medium;
   b) subjecting the suspension to ultrasonic waves under conditions suitable to shatter the phospho gypsum crystal lattice releasing the bound water soluble $P_2O_5$ into the aqueous medium to produce phosphoric acid and a depleted phospho gypsum;
   c) separating the phosphoric acid from the depleted phospho gypsum and recovering the separated phosphoric acid; and
   d) optionally further treating the depleted phospho gypsum in a step to further reduce the level of any remaining water soluble $P_2O_5$ present in the depleted phospho gypsum, wherein the level of the water soluble $P_2O_5$ in the depleted phospho gypsum is reduced to about 0.01% by weight.

2. A process according to claim 1, wherein the further treatment step comprises the sonication of the depleted phospho gypsum in an aqueous medium and/or the addition of a neutralizing agent to the aqueous medium to convert the water soluble $P_2O_5$ into an insoluble phosphate.

3. A process according to claim 1, wherein the suspension is subjected to ultrasonic waves having a frequency of less than or equal to 20 kHz.

4. A process according to claim 3, wherein the suspension is simultaneously subjected to two different frequencies less than or equal to 20 kHz.

5. A process according to claim 4, wherein the suspension is simultaneously subjected to a first frequency of about 16 kHz and to a second frequency of about 20 kHz.

* * * * *